Patented Aug. 11, 1925.

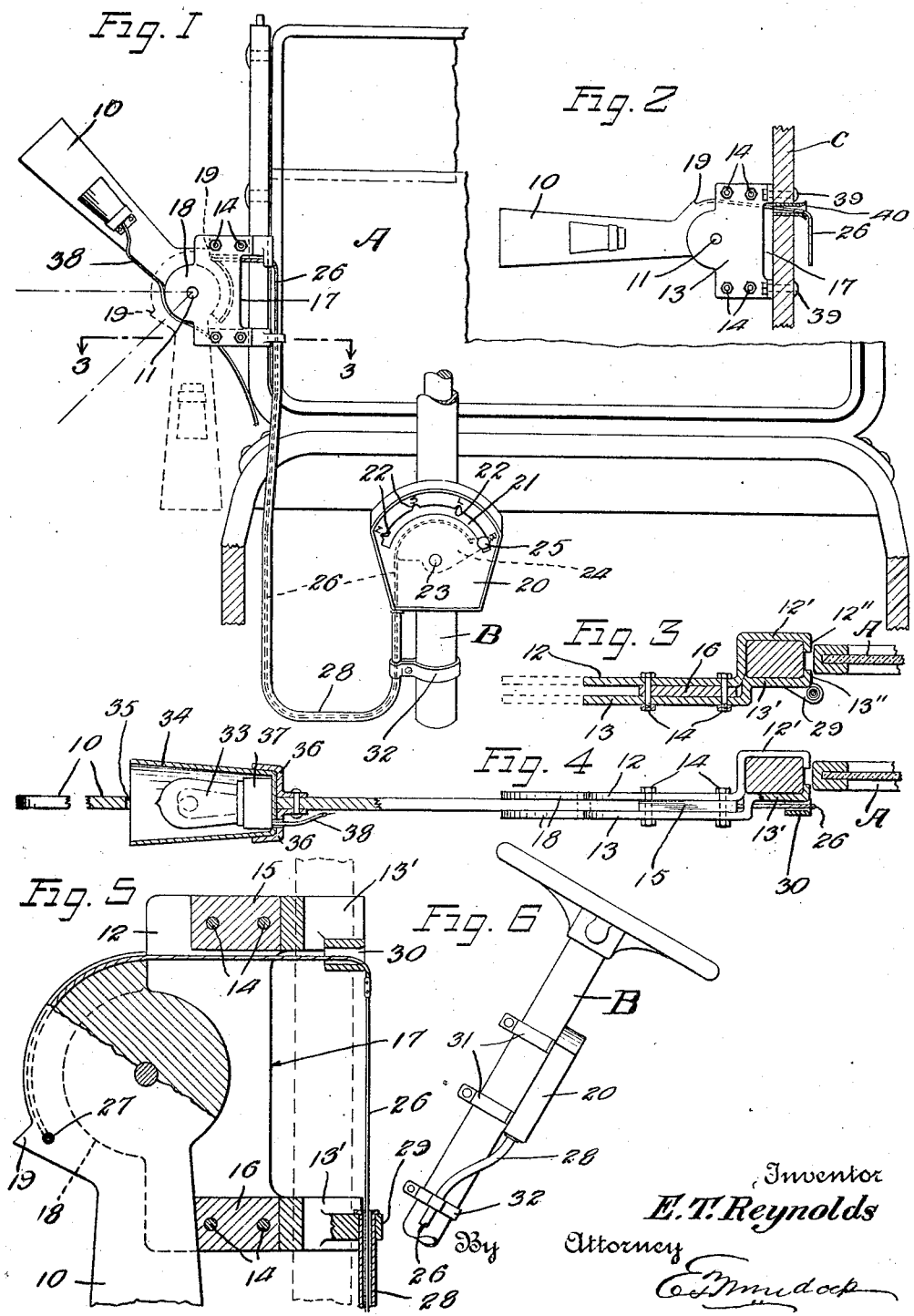

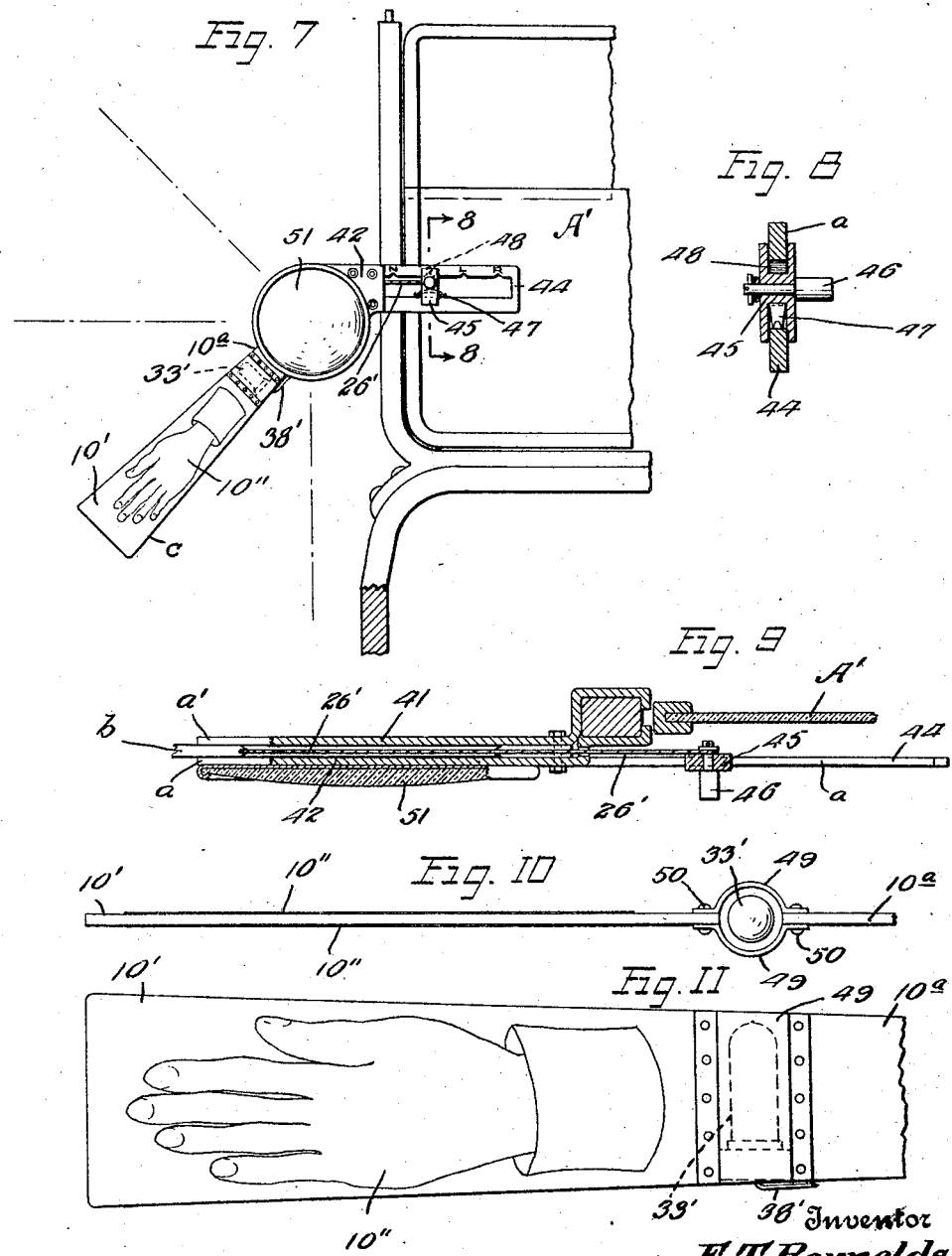

1,549,047

UNITED STATES PATENT OFFICE.

EDGAR T. REYNOLDS, OF BROOKLYN, NEW YORK.

VEHICLE SIGNAL.

Application filed May 3, 1923. Serial No. 636,282.

*To all whom it may concern:*

Be it known that I, EDGAR T. REYNOLDS, a citizen of the United States, residing at Brooklyn, in the county of Kings and State of New York, have invented new and useful Improvements in Vehicle Signals, of which the following is a specification.

This invention appertains to certain improvements in visual signals for vehicles, and more particularly to a type thereof for the indication of contemplated directional movements of a vehicle as a warning to drivers of other cars as well as to traffic officers and pedestrians.

The principal object of the invention is to provide for a signal as characterized, and one which will be plainly visible both day and night, and which may be readily operated by the driver of an automobile or other type of vehicle without interfering with his or her control of the movements thereof or otherwise detracting his or her attention from such control.

Another object of the invention is to provide for a signal of the type set forth, and one embodying a mechanical control means to be conveniently located directly in front of the driver of a vehicle, and, in the case of an automobile or other type of motor driven vehicle, the same will be mounted on the steering post within easy reach of either hand of the driver whereby he may manipulate the signal to proper indicating position with one hand while maintaining his grasp of the steering wheel with the other hand to keep the vehicle within control at all times.

A further object of the invention is to provide for a signal device of the character mentioned, and one of an extremely simple construction and arrangement, such as may be readily mounted at either side of a vehicle, and which will be easy to operate, inexpensive to manufacture and install, and durable to not require constant care and attension.

With the foregoing and other equally important objects in view, the invention resides in the certain novel and useful construction and arrangements of parts as will be hereinafter more fully described, set forth in the appended claims, and illustrated in the accompanying drawings, in which:—

Figure 1 is a fragmentary vertical transverse section through an automobile, and showing a preferred embodiment of the signal as applied thereto, Figure 2 is a fragmentary vertical section through a side wall of a closed type of automobile, and showing the manner of mounting the signal thereon, Figure 3 is a fragmentary horizontal section through the frame of a windshield of an automobile, and showing the manner of clamping the signal arm in position thereon, the same being taken on line 3—3 of Figure 1, Figure 4 is a view similar to that of Figure 3, but showing the entire signal arm as attached to the clamping means, Figure 5 is a side elevation of the pivoted end portion of the signal arm and the clamping means therefor, but showing both partly in section, Figure 6 is a side elevation of the upper end portion of the steering post of an automobile, and showing the manner of mounting the signal control device or means thereto, Figure 7 is a view similar to Figure 1, but showing a slightly modified form of the invention as applied to the windshield frame of an automobile, Figure 8 is a vertical sectional detail taken on the line 8—8 of Figure 7, Figure 9 is a horizontal sectional detail taken on the line 9—9 of Figure 7, Figure 10 is a top plan view of the modified form of signal arm, and, Figure 11 is a fragmentary side elevation of the latter.

Referring to the drawings, and more particularly to Figures 1 to 6 inclusive wherein similar characters of reference designates corresponding parts of the preferred embodiment of the invention throughout the same, the signal arm is shown as mounted at one side of the windshield A, although it may be as readily located on any other part of an automobile in a manner to be conspicuous and in full view from either the front or rear ends thereof.

The signal is preferably in the form of a blade or arm semaphore 10 arranged to swing vertically on a pivot 11 extended between two bracket plates 12 and 13 having their inner ends disposed in clamping engagement one to either side of the vertical bar at the left hand side of the windshield frame, bolts or other similar fastenings 14 11v being passed through the plates 12 and 13 to impart thereto the necessary clamping action to securely maintain the signal arm 10 at all times in position of readiness for operation. These two bracket plates 12 and 13 are spaced apart the required distance to receive between the same the inner pivoted end of the semaphore arm 10, by means of blocks 15 and 16 disposed inwardly of the upper and lower edges thereof, and the bolts 14 pass through the blocks when the parts are assembled together. The inner ends of the plates 12 and 13 are provided with intermediate cutaway portions 17 to form upper and lower extended portions 12' and 13', the portions 12', of the plate 12, being angularly bent to engage around the outer forward side of the frame of the wind shield A, and the portions 13', of the plate 13, are similarly bent to engage the inner or rear side of the said frame, while the free ends of the several portions 12' and 13' are inturned toward each other, as at 12" and 13", respectively, to engage the inner face of the frame to either side of the glass supported within the frame. The outer vertical edge of the plates 12 and 13 are formed to provide intermediate semi-circular portions 18 to provide a firm bearing surface to either side of the inner pivoted end of the semaphore arm 10, which end is of a circular formation and of a greater diameter than that of the circle defined by the arc of the semi-circular portions 18 and of which the pivot is the center. The edge of the inner circular end portion of the semaphore arm 10 is provided with shouldered portion 19 which acts as a stop to limit the upward swing of the semaphore, and engages the outer end of the upper spacing block 15 for the purpose.

For imparting the desired swinging movement to the semaphore arm 10, a mechanical operating device is to be secured in position on the steering post B of the automobile, and the same comprises a casing 20, in the front wall of which is provided an arcuate slot way 21, which is suitably indexed, as by being equidistantly notched, as at 22, which notches are suitably designated, reading from left to right, "N"; "S"; "L" and "R", to correspond to the "neutral"; "stop"; "left" and "right", indication positions of the semaphore arm 10. Pivoted centrally within the casing 20, as at 23, is an operating arm or segment 24 having an extending portion up one side edge thereof exposed through the slot-way 21 to receive thereon an operating knob or finger piece 24 projected outwardly of the slot-way, and, by means of which, the arm or segment 24 may be readily swung on its pivot 23 for the moving of the extended end portion thereof from one end of the slot-way 21 to the other end of the same. The knob or finger piece 25 may be provided with a suitable detent or the like (not shown) for engagement with the notches 22, whereby the arm or segment 24 and the semaphore 10 will be retained in a desired signal-position, and allow the driver of the automobile to make use of both hands in controlling the latter during the completion of the directional movement thereof for which the semaphore arm has been set to indicate. The movements of the arm or segment 24 are transmitted to the semaphore arm 10 by means of a flexible element 26, such as a cord, cable or wire which has one end secured to the arm or segment 24 at a point adjacent the knob or finger piece 25, and its other end trained around the periphery of the circular inner end portion of the semaphore arm 10 and is secured thereto, as at 27 in Figure 5. The operating arm or segment 24 is made in segmental form to provide a cover edge over which the attached end of the flexible element 26 is trained, so that the pull exerted thereby on the latter is in a direct line with the point of entrance of the flexible element in to the casing 20. The intermediate portion of the flexible element 26 is led from the bottom side of the casing 20 through a tube or conduit 28 extending therefrom to a point of connection of the same with the bracket arm 29 formed with the lower of the angular bent clamp portion 13', of the plate 13, and is then trained from the tube 29 to and through a guide eye 30 formed at the outer side of the upper clamp portion 13', of the plate 13, and from thence outwardly between the plates 12 and 13 for connection with the semaphore arm 10, as hereinbefore explained. It is to be noted that the clamp portions 12' and 13', of the plates 12 and 13, are offset from the latter, in a forward direction, whereby the plates extend outwardly from one side of the windshield A in a plane offset from the rear of the wind shield. The casing 20, of the signal operating device, is to be secured to the steering post B in any suitable manner, as for instance, by means of clamp bands 31, and similarly the attached portion of the tube or conduit 28 is secured to the post B by the clamp band 32.

In the operation of the signal as thus constructed and arranged, and with the same and its operating device mounted and connected in the manner as hereinbefore explained, signal arm of semaphore 10 will be normally disposed in its lowered or "neutral" position, when it will depend upon its pivot 11 in close parallel relation to the adjacent side of the automobile, with its inner edge engaged between the adjacent edges of the plates 12 and 13 and in abutting relation to the outer end of the lower spacing block 16. In its position of the semaphore arm 10 the operating arm or segment 24 will have been moved to the left hand end of the slot-way 21, in the casing 20, with the knob or finger piece 25 disposed in registry with the "neutral" notch "N", with the vehicle in motion, and it is desired or necessary to slow down its speed, and to give warning of the fact to oncoming vehicles, the operator will grasp the knob or finger piece 25 with one hand and move the arm or segment 24 to the right until it registers with the second knob "S", when the semaphore arm 10 will be swung outwardly from the side of the vehicle to a downwardly inclined or "slow" indicating position. Now, if a left hand turn has to be made by the automobile, the driver will move the knob or finger piece 25, of the arm or segment 24, in to registry with the "left" notch "L", when the flexible element 26 will be pulled to swing the semaphore arm 10 upwardly to an upwardly directed horizontal position, or, if a right hand turn is to be made, the manipulation of the knob or finger piece 25 will be continued in the right hand direction of the slot-way 21, until the knob or finger piece registers with the "right" notch "R", when the semaphore arm 10 will be swung to an upwardly and upwardly inclined position, all of which signaling positions of the latter correspond to the universally recognized hand signals now in use.

To increase the visibility of the semaphore arm, the same is to be painted a distinctive color, preferably red, and, to render this visibility effective by night as well as by day, it is contemplated to provide a means to illuminate semaphore arm 10 for the purpose, and, in the preferred form of the invention this illumination is to be readily accomplished by positioning an electric lamp 33 within a suitable reflector 34, which is mounted within an opening formed at the central point through the semaphore arm 10, and in a manner that the light rays through the lamp will be directed upwardly along the opposite side faces of the semaphore arm. As shown in Figures 1, 2 and 4 this reflector 34 is preferably of a tapered tubular construction mounted in an elongated opening 35 formed lengthwise of the semaphore arm 10, and having its open end directed toward the outer end of the semaphore. The inner end of the tubular reflector is closed, and is engaged by clamp members 36 bolted, or otherwise secured, at the opposite sides of the semaphore arm. Mounted on the inner face of the closed end of the reflector is a lamp socket 37 for the reception therein of the electric lamp 33, and this socket is electrically connected by means of a conductor 38 leading therefrom through an opening formed in the closed end wall of the reflector and in registry with an opening formed in the adjacent end of the clamp members 36, for connection with the usual lighting circuit of the automobile. This signal lamp 33 may be suitably controlled, correspondingly with the cutting in and out of circuit usual running lights of an automobile, and from the usual lighting switch mounted on the dash.

Referring now to Figure 2, wherein is shown a manner of installing the signal on a closed type of automobile, the clamp plates 12 and 13, constituting the supporting bracket for the semaphore arm 10, are slightly modified at their inner edges to provide outwardly bent ears 13$^a$ at the upper and lower ends of the cutaway portions 17 thereof in lieu of the angular clamp portions 12' and 13', as in the first instance of the invention. These ears 13$^a$ are to be abutted directly against the outer face of the side wall C, of the closed body of the automobile and engaged by bolts 39 passed through the latter, so that the semaphore arm 10 is supported in a position corresponding to that in the mounting of the same at one side of the windshield A of an open type of automobile. The flexible element 26 is led from its point of connection with the semaphore arm 10 inwardly between the plates of the bracket 13 and is passed to the inside of the wall C through a short tube 40 fitted in an opening formed in the latter for its reception. From the tube 40, the flexible element 26 passes to and connects the arm or segment 24 of the operating device, as hereinbefore explained, and transmits the movements of the latter to the semaphore arm 10 in the usual manner.

In Figures 7 to 11, inclusive, there is shown a further modified form of the invention, and, in this instance, the semaphore arm 10' is preferably formed from a clear glass having a ground surface thereon in resemblance to an outwardly extended hand, as at 10''. The inner and smaller end of the semaphore arm 10' is pivoted between the spaced bracket plates 41 and 42, which are preferably of a circular formation except for the angularly offset portions 43 arranged for clamping engagement at the opposite sides of the vertical post at one side of the windshield A', after the manner of the clamp portions 12' and 13', of the bracket plates 12 and 13.

The operating device for this latter form of signalling device, comprises a horizontally disposed plate 44 extending in rear of the windshield A' from the inner side of the bracket plate 42 and in alignment therewith. This plate 44 is slotted longitudinally, and slidable along the slot thereof is an actuator block or slide 45 which is grooved at its upper and lower ends for sliding engagement with the opposed parallel sides of the slot. A flexible element 26' is attached at one end to the slide block 45 and has its other end extended through the slot from which it is passed outwardly between the bracket plates 41 and 42 for connection with the pivoted end of the semaphore arm 10′, whereby to transmit the operative movements of the slide block 45 to the latter as in the preferred form of the device. Formed in spaced relation along the upper edge of the slot in the plate 44, are a series of equidistantly spaced notches, designated from left to right, "N"; "S"; "L" and "R", to correspond to the "neutral"; "stop"; "left" and "right" indicating positions of the semaphore arm 10′. The slide block 45 is provided with a finger piece 46 for its manipulation, and to prevent free movement of the same along the slot in the plate 44, a friction spring 47 is positioned within the lower slotted end thereof to bear against the opposed edge of the latter. The inner wall of the upper slotted end of the slide block 45 is formed to provide a projection 48 to engage in the notches spaced along the upper side of the slot way in the plate 44, the said projection being substantially V shape in form so as to readily ride into and out of engagement with the several notches, when the block 45 is moved from one of the latter to the other. In operating the slide block 45, the same will be depressed against the tension of the friction spring 47 to free the projection 48 from engagement with a notch, and then moved along the slot way in the plate 44 until the next desired notch is reached, when the spring 47 will act to seat the projection 48 into the selected notch.

In the instance of the invention, the semaphore arm 10′ is preferably made into an inner pivoted part 10ᵃ and the outer signaling post 10′, and the adjacent ends of these parts are to be secured together, preferably in spaced relation as shown, by means of semi-cylindrical members 49 one being disposed at each side of the point between the arm sections and secured in clamping relation by means of rivets, bolts and the like 50. These members 49, when so positioned, forms a substantially cylindrical housing extending transversely of the semaphore arm 10′ for the reception of an electric lamp 33′, whereby light will be emitted to the glass signal arm through the connected end of the outer section thereof and from between the members 49. When the lamp is illuminated the light therefrom passes through the glass of the arm turning the same a faint light greenish color, and in a manner that the ground portions 10″ are illuminated in correspondence therewith. This lamp 33′ will be connected by a conductor 38′ to the usual lighting circuit of the automobile.

If desired a mirrorscope 52 may be mounted on the rear face of the circular portions of the bracket plate 42, where it will be convenient to the driver of the automobile to view the conditions of traffic to the rear at all times. A similar mirrorscope may also be used with the form of the signal device as shown in Figures 1 to 6, inclusive, and, in each instance, will be mounted on the bracket plates 13 and preferably in concentric relation to the pivots 11.

From the foregoing, it will be readily apparent that, while preferred embodiments of the signal have been described and illustrated herein in specific terms and details of construction and arrangement, various changes in and modifications of the same may be resorted to without departing from the spirit of the invention or the scope of the claims appended hereto.

Having thus fully described the invention, what is claimed, is:—

1. A vehicle signal comprising a bracket formed of two plates adapted to be clamped on a windshield frame in parallel relation, a spacing block secured between said plates, a semaphore having one end thereof pivotally journalled between said plates, manually controlled means for actuating the semaphore to indicating positions, and a shoulder on said semaphore end for engagement with said spacing block between said plates to limit movement of the semaphore.

2. A vehicle signal comprising a bracket formed of two plates adapted to be clamped on a windshield frame in parallel relation extending from one side thereof, an upper and a lower spacing block secured between said plates in vertical spaced relation, a semaphore pivotally movable between said plates and having a bearing in each plate, said semaphore having a portion thereof adapted to engage said lower spacing block to arrest lowering movement thereof, a shoulder formed on said semaphore to engage said upper spacing block to arrest raising movement thereof, and manually controlled means for operating said semaphore.

3. In a vehicle signal, a windshield bracket, a semaphore section pivoted in said bracket, an indicating section for said semaphore, transparent plates connecting said sections in spaced relation, semaphore illuminating means carried between said plates and between said sections, and manually controlled means for operating said semaphore.

EDGAR T. REYNOLDS.